Oct. 21, 1952
M. G. COPLEN
2,614,705
TREE MOVER
Filed Oct. 19, 1948
4 Sheets-Sheet 1
FIG. 1
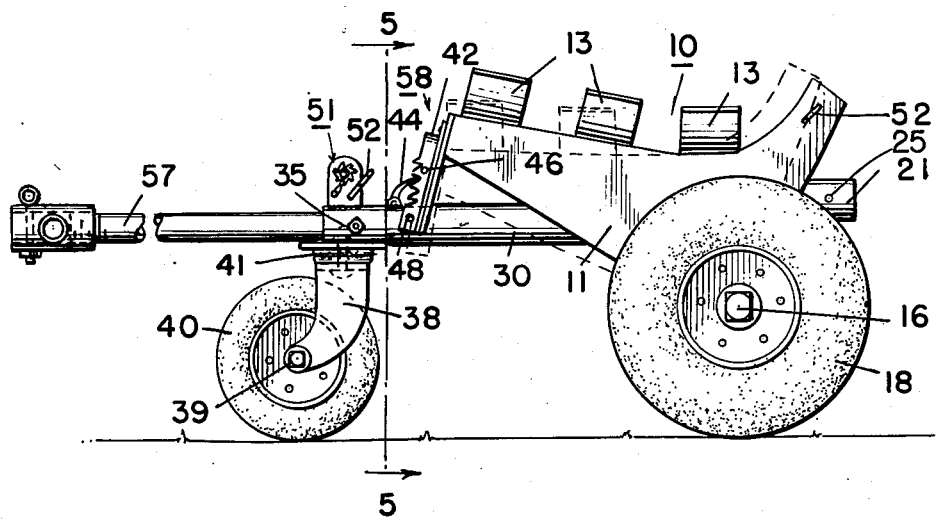
FIG. 2
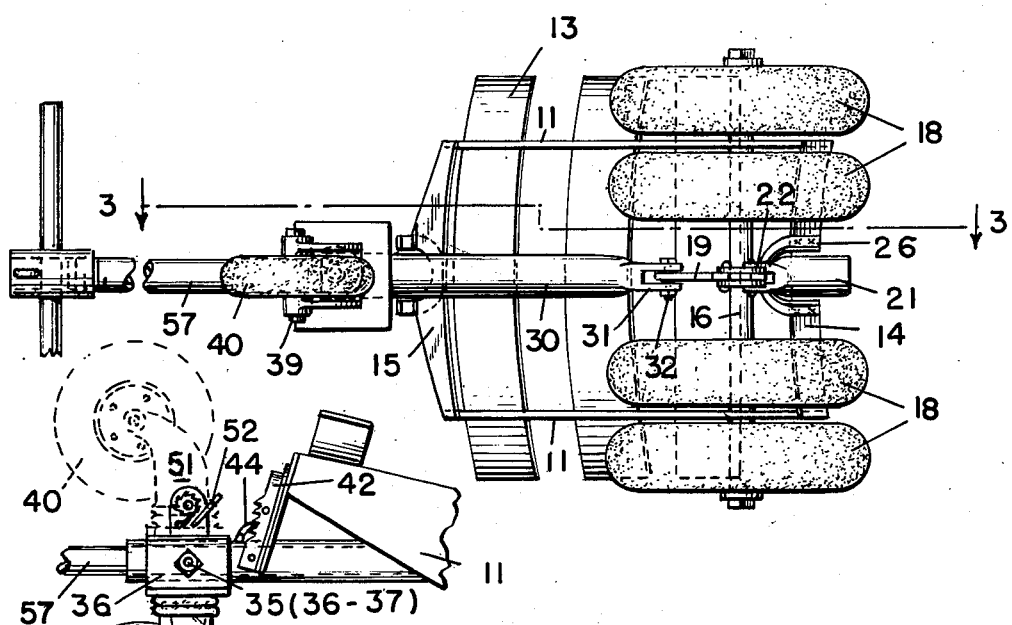
FIG. 9
INVENTOR.
MILO G. COPLEN,
BY
Stone, Boyden & Mack
ATTORNEYS.

Oct. 21, 1952 M. G. COPLEN 2,614,705
TREE MOVER
Filed Oct. 19, 1948 4 Sheets-Sheet 2

INVENTOR.
MILO G. COPLEN,
BY
Stone, Boyden & Mack
ATTORNEYS

Oct. 21, 1952     M. G. COPLEN     2,614,705

TREE MOVER

Filed Oct. 19, 1948     4 Sheets-Sheet 3

INVENTOR.
MILO G. COPLEN,
BY
Stone, Boyden & Mask
ATTORNEYS

Oct. 21, 1952  M. G. COPLEN  2,614,705
TREE MOVER

Filed Oct. 19, 1948  4 Sheets-Sheet 4

INVENTOR:
MILO G. COPLEN,

BY *Stone, Boyden & Mack*
ATTORNEYS.

Patented Oct. 21, 1952

2,614,705

UNITED STATES PATENT OFFICE 2,614,705

TREE MOVER

Milo G. Coplen, Rockville, Md.

Application October 19, 1948, Serial No. 55,361

17 Claims. (Cl. 214—3)

1

This invention relates to improvements in apparatus for moving trees from one location to another.

In my Patent No. 1,975,160, issued October 9, 1934, I disclosed a tree moving method and apparatus in which, during movement, the tree is supported solely by the tree ball. Prior methods and apparatus involved some clamping or fastening to the tree trunk, and this objectionable feature was eliminated by the method and apparatus disclosed in that patent. In my Patent No. 2,242,695, issued May 20, 1941, there is also disclosed improved apparatus for moving a tree while supporting it solely from the tree ball.

The present invention relates to improved apparatus for transporting a tree which can be more easily operated, and whereby one man can load a tree upon the device and thereafter move the tree without assistance.

One of the features of the present invention is the provision of apparatus which can be used during the excavation of a tree and thereafter serve to transport it.

A further feature resides in structure which is provided with detachable pushing and pulling means attachable at either end of the device and which may also be used as a lever to accomplish the excavating of the tree.

Other features and objects of my invention will be apparent from the accompanying description and drawings, of which:

Fig. 1 is a side elevation of the mover;

Fig. 2 is a plan of the device viewed from underneath;

Fig. 9 is a detailed elevation of the device as shown in Fig. 1 showing in dotted lines the front wheel swung to an upper position off of the ground.

Figure 3:
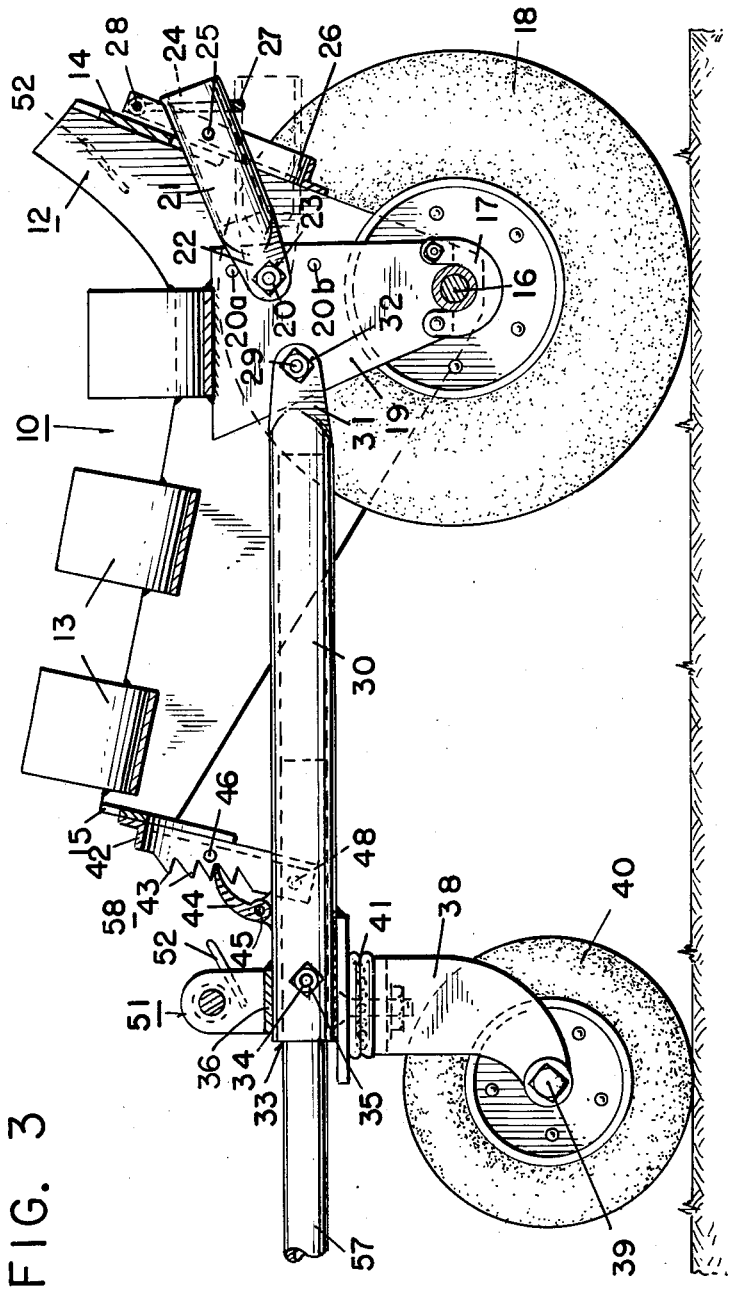
Fig. 3 is a cross section taken along the line 3—3 of Fig. 2.

Referring now to the drawings, the cradle is indicated generally by the reference numeral 10. The cradle 10 comprises a pair of vertically disposed longitudinal frame members 11 joined laterally at the back by cross frame member 14 and at the front by a cross frame member 15 to form

Figure 4:
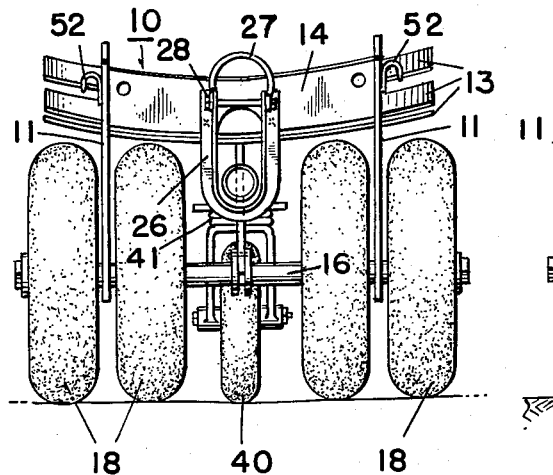
Fig. 4 is a rear elevation of the device.
Figure 5:
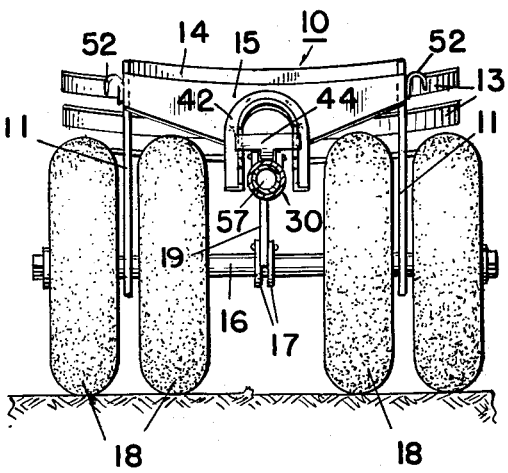
Fig. 5 is a front elevation.
Figure 6:
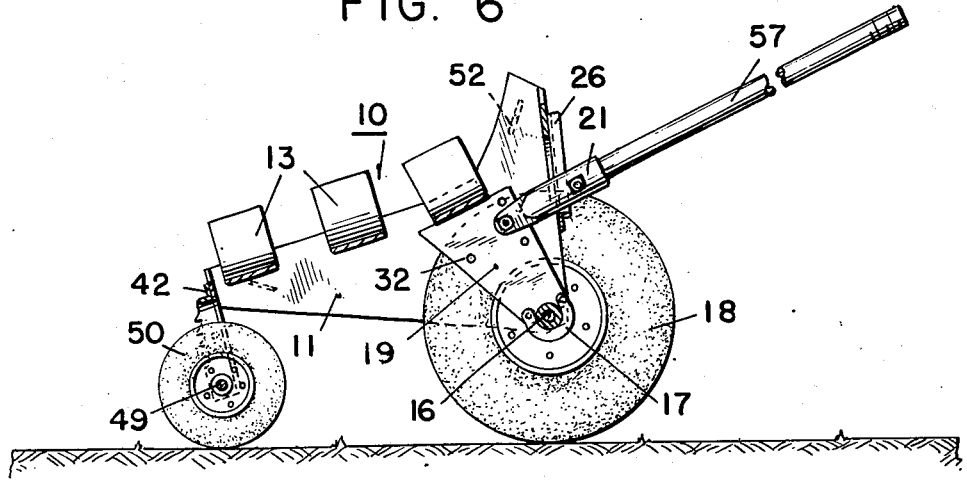
Fig. 6 is a cross-section taken along the same line as that of Fig. 3 and showing the device as rigged for light work.

2 a rigid support for a rearwardly and upwardly inclined excavating element 12 and a plurality of trough shaped elements 13 forming the tree ball supporting or transporting portion of the cradle. Near the bottom of the longitudinal members 11 suitable mountings are provided for a horizontally disposed axle 16, carrying ground engaging wheels 18. Midway between the longitudinal members 11, a vertical member 19 is attached, as by welding, at its upper end to a trough shaped element 13, and at its lower end to axle 16 by means of shackles 17. One or more holes 20, 20a, and 20b, spaced from each other preferably at different levels, are provided in the member 19, and a rearwardly disposed drawbar attaching means 21, bifurcated at 22, is provided with holes passing through the legs so formed which, when aligned with one of the holes 20, 20a, or 20b, enable a pivoting means such as a bolt and nut 23 to be inserted to secure the attaching means 21 to member 19. This allows the attaching means to have a certain amount of vertically pivotal movement which is limited in its upward direction by the lateral member 14, and in its extreme downward movement by the hanger member 26, attached to member 14. The attaching means 21 is provided with socket means 24 at its free end for operative engagement with an end of the drawbar 57. The hole 25, Fig. 3, enables a locking pin to be inserted which may pass through a similar hole provided in the drawbar, to lock the drawbar in the socket, as shown in Fig. 6. A movable, or retractible stop member is provided on the cradle to limit the movement of the drawbar 57 downward and away from cradle 10 when in engagement with the socket 21. This stop means takes the form of a stirrup 27, pivotally supported at 28 on the hanger 26 which may be swung down under the socket 21 or when not desired, may be swung upwardly out of the way as shown in Fig. 4.

The device also includes a forwardly extending drawbar attaching member 30 mounted on the member 19 of the cradle for vertically pivotal movement. At its rear end, the member 30 is bifurcated, as shown at 31, and is mounted on the member 19 by means of a conventional bolt extending through a hole 32 in the member 19 and the bifurcated portions of the drawbar attaching member 30. At its forward end, the drawbar attaching member 30 includes a socket portion 33 for operative engagement with the drawbar 57, as seen in Fig. 3, and a transverse hole 34 in the socket portion enables a locking means, such as the bolt 35, to be inserted. It will be understood that the socket means 21 is similar to the socket means 33, and with their associated locking means enables a single drawbar to be easily and quickly attached and detached from either of the socket means, the arrangement being such that the drawbar is rigidly engaged with the socket for transmitting pushing, pulling or turning movement to the cradle 10 of the apparatus. In the preferred embodiment I have shown the sockets as having female coupling elements for engagement with a male coupling element on the drawbar, but it will be understood that the positions of the elements may be reversed, and that instead of using round coupling elements, square or irregularly shaped elements could be substituted.

Figure 7:
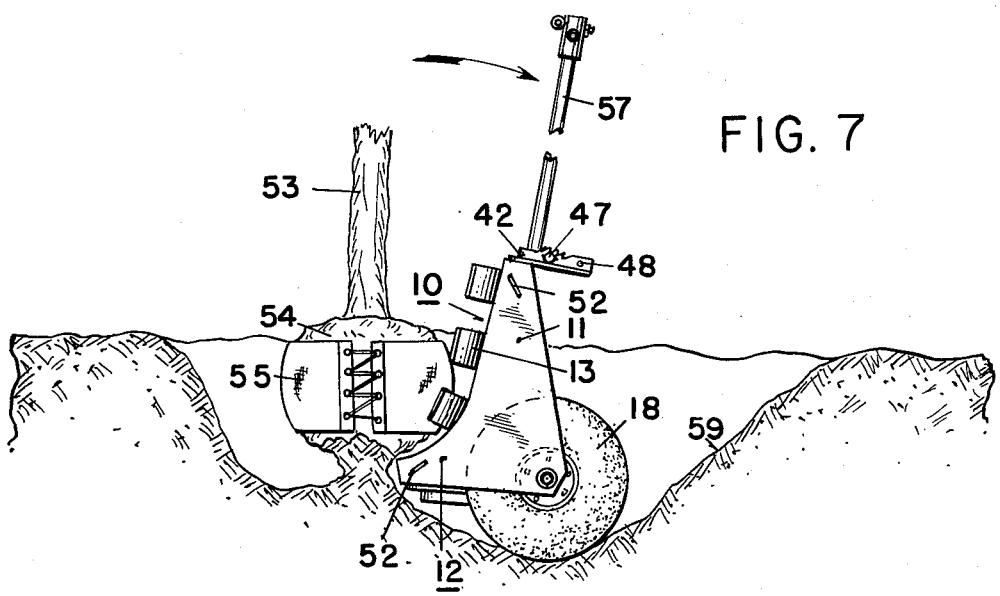
Fig. 7 shows the device being used to excavate a tree.

A suitable collar 36 surrounds the socket portion 33 and is provided with a hole 37 in registry with the hole 34 in the socket portion in order to receive the locking means 35. Attached to the collar 36 is a freely rotatable pivot bearing 41 which provides support for the fork 38 provided with the axle 39 carrying the front wheel 40. Adjustable supporting means, generally indicated at 58, connects the frame member 30 and the front part of the cradle 10, in order that the weight of the load may be distributed, when in transporting position, between the wheels 18, and the swiveled front wheel 40. A preferred form of supporting means comprises an inverted U-shaped member 42 attached to the lateral member 15, and provided with ratchet teeth 43. The pawl 44, pivoted as at 45, is attached to the drawbar attaching member 30 so as to be engageable with the teeth 43. Retractable stop means is also provided for limiting movement of the drawbar 57 away from the cradle 10 when the drawbar, in engagement with the socket means 33, is used for excavating a tree, as shown in Fig. 7. This stop means includes aligned holes 46 provided in the inverted U-shaped member 42, through which may be inserted a pin 47. Another pair of aligned holes 48 in the member 42 are provided to receive the axle 49 of a supplementary front wheel 50, which may be attached (see Fig. 8) for certain purposes, to be explained. Hooks 52 are placed at convenient points on the apparatus, for securing tie-down rope 56, and a conventional winch for tightening the rope may be attached to the collar 36, as indicated at 51.

In operation, the device may be used in a number of ways. In Fig. 7, a tree 53 is shown, around which earth has been removed leaving a trench having inclined sides and a ball of earth and roots 54 around the base of the tree. To preserve the tree ball 54, while being transported a heavy web 55 may be secured around it. The cradle 10 of the apparatus is shown in this figure in its excavating position with the excavating element 12 inserted under the tree ball 54. If the tree is a small one, the outermost wheel 18 on each side of apparatus may be removed to narrow the tread of the apparatus to permit a lesser amount of earth to be dug out around the tree than if the outer wheels remained in place. In addition the collar 36 with the swiveled wheel 40 and winch 51 may also be removed from the frame member 30 in order to give additional clearance around the front end.

Figure 8:
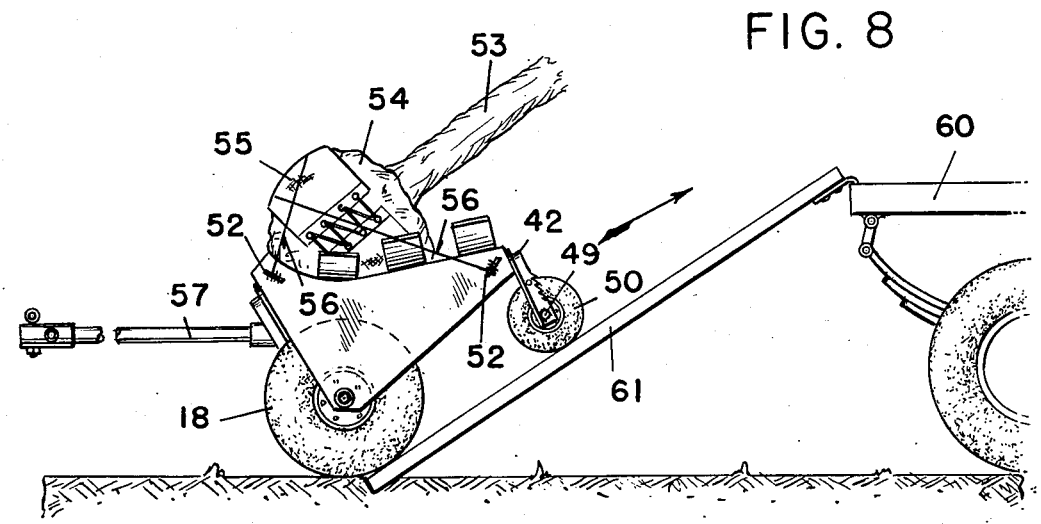
Fig. 8 illustrates the manner in which the device can be used to load a tree on a truck.

After the tree ball 54 has been secured to the cradle 10 by means of rope 56 running through hooks 52, the drawbar 57, in engagement with forwardly disposed socket 33 and held against vertical movement with respect to the cradle by stop pin 47, may be used to rock or pivot the cradle from its excavating position to the transporting position shown in Figs. 6 and 8. In the latter figures the device is shown supported in equilibrium by wheels 18 and detachable front wheel 50. It will be noted that the wheel 50 has not been attached while the device is in the trench, as shown in Fig. 7. When the cradle is first pivoted into transporting position, the member 15 will rest on the drawbar attaching member 30, thus allowing the drawbar to be used to pull the apparatus up the incline 59. With the wheel 50 removed, greater clearance is provided between the front portion of the device and the incline 59 during the process of removing the tree ball from the trench. When once upon level ground the wheel 50 may be attached, and drawbar 57 may be disengaged from the socket means 33 and transferred to rearwardly disposed socket means 21, as shown in Figs. 6, and 8. With the drawbar in this position the apparatus may be pushed or pulled along the ground, and particularly may be easily pushed upon a truck body 60, by means of a runway 61, as shown in Fig. 8.

Where large trees are being moved, or where it is desirable to use the apparatus as a trailer for transporting the tree over a substantial distance without loading it upon another conveyance, the supplementary front wheel 50 is detached, and the collar 36 provided with the swiveled wheel 40 and the winch 51 is placed on the member 30. During the operation of excavating the tree ball the position of the collar may be reversed, to an upper position, as shown by broken lines in Fig. 9, and held in place by locking means 35, thus providing maximum clearance while the apparatus is pulled up the incline 59. When the level ground is attained, the locking means 35 may be removed, the swiveled wheel 40 be swung downwardly as in Fig. 1, and the locking means 35 replaced.

The elevation of the cradle while transporting a tree ball may be adjusted by means of the ratchet and pawl mechanism 58. In its lowermost position the member 15 will rest directly on the member 30 as shown by dotted lines in Fig. 1. A preferred means for raising the front of the cradle is to place the stop means 27 in engagement with the rearwardly disposed socket means 21, then to place the drawbar 57 in engagement with the socket 21, after which a downward pulling force on the drawbar will raise the front end of the cradle 10, enabling the pawl 44 to engage the appropriate ratchet tooth 43.

The winch 51 may be used, if necessary to tighten ropes 56, holding the tree ball in place, but it will be appreciated that the ropes may also be tightened without the use of the winch. If the ropes are secured to the hooks 52 on the collar 36 when the cradle is in its lowermost position (dotted lines in Fig. 1), the leverage exerted by the drawbar in raising the cradle (solid lines in Fig. 1) will produce increased tension in ropes 56.

It will also be appreciated that when a large tree is being transported on the apparatus over a substantial distance it will be desirable to attach the outermost wheels 18 in order to save wear, and to provide greater lateral stability. Furthermore, with the swiveled wheel 40 attached, as in Fig. 1, the drawbar 57 may be engaged either with the socket 21, or the socket 33 for pushing the device, and for steering it. And, as a feature of additional utility, the forward drawbar attaching member 30, with associated elements, may be removed entirely, as shown in Fig. 6, in which case the cradle 10 may be supported in equilibrium in its transporting position, either by the supplementary wheel 50, or by downward force exerted on the drawbar 57 while in engagement with the rearwardly disposed socket means 21. A convenient angle for the drawbar may be chosen, according to which of the holes 20, 20a, or 20b is used as a bearing surface for the bolt means 23.

What I claim is this:

1. In a tree moving apparatus, the combination of a wheeled tree ball supporting cradle, forwardly extending and rearwardly extending drawbar engaging means attached thereto for vertically pivotal movement, and a retractible stop means operatively associated with one of said drawbar engaging means to limit downward pivotal movement thereof relative to said cradle to enable a drawbar engaged with said one of said drawbar engaging means to be used to rock said tree ball supporting cradle.

2. In a tree moving apparatus, the combination of a wheeled tree ball supporting cradle, a forwardly extending drawbar socket attached to said cradle for vertically pivotal movement, a rearwardly extending drawbar socket attached to said cradle for vertically pivotal movement, a drawbar having means for detachable engagement with either of said sockets, and retractible stop means operatively associated with said rearwardly extending drawbar socket to enable said drawbar, when engaged in said rearwardly extending socket, to be used to rock said tree ball supporting cradle, said means including a saddle pivotally mounted on said cradle and movable to a position in which said saddle is engaged beneath said rearwardly extending drawbar socket to limit downward pivotal movement thereof.

3. In a tree moving apparatus, the combination of a wheeled tree ball supporting cradle, rearwardly extending and forwardly extending drawbar sockets mounted thereon for vertically pivotal motion, a drawbar having means for detachable engagement with either of said sockets, and means enabling the engaged drawbar to be used to rock said tree ball supporting cradle, said means including a stop pivotally mounted on said cradle for movement into a position to engage one of said sockets to limit downward movement thereof with respect to said cradle.

4. In a tree moving apparatus, the combination of a wheeled tree ball supporting cradle, rearwardly extending and forwardly extending drawbar sockets mounted thereon for vertically pivotal motion, a drawbar having means for detachable engagement with either of said sockets, and means enabling the engaged drawbar to be used to rock said tree ball supporting cradle, said means including a removable stop pin for limiting downward movement of one of said drawbar sockets.

5. In a tree moving apparatus, a tree ball supporting cradle mounted on wheels, rearwardly extending and forwardly extending vertically pivotal drawbar attaching means, a drawbar having means for detachable engagement with either of said drawbar attaching means, and means enabling the drawbar to rock the cradle about the axis of its wheels while in engagement with either of said drawbar attaching means including movable stop means attached to the cradle rearwardly of the wheel axle and movable stop means attached to the cradle forwardly of the wheel axle, said stop means being operative to limit downward movement of the drawbar with respect to the cradle when engaged respectively with the rearwardly extending or forwardly extending drawbar attaching means.

6. In a tree moving apparatus, the combination of a tree ball supporting cradle; a set of ground wheels, said cradle being supported by said wheels for pivotal motion about the axis of rotation of said wheels; rearwardly extending and forwardly extending drawbar attaching sockets mounted on said cradle for vertically pivotal motion; a drawbar having means for detachable engagement with either of said sockets, and means enabling the drawbar when engaged in one of said sockets to rock said tree ball supporting cradle about said axis, said means including a movable stop attached to said cradle rearwardly of said axis and a movable stop attached to said cradle forwardly of said axis, said stop means when in operative position being in engagement respectively with said rearwardly extending socket and said forwardly extending socket to limit downward movement thereof with respect to said cradle.

7. In a tree excavating and transporting apparatus, the combination of a tree ball supporting cradle having rear wheels disposed rearwardly of the center of gravity of the load while being transported, a forwardly extending drawbar attaching member mounted on said cradle for vertically pivotal movement, a front wheel mounted on said drawbar attaching member forwardly of the center of gravity of the load while being transported, movable stop means mounted on said cradle which when in operative position limits downward pivotal movement of said drawbar attaching member with respect to said cradle when a tree is being excavated, and adjustable supporting means connecting said cradle and said drawbar attaching member forwardly of said rear wheels.

8. In a tree excavating and transporting apparatus, the combination of a tree ball supporting cradle having rear wheels disposed rearwardly of the center of gravity of the load while being transported, a forwardly extending drawbar attaching member mounted on said cradle for vertically pivotal movement, a front wheel mounted on said drawbar attaching member forwardly of the center of gravity of the load while being transported, removable stop pin means on said cradle for limiting downward pivotal movement of said drawbar attaching member with respect to said cradle when a tree is being excavated, and pawl-and-ratchet means supporting said cradle on said forwardly extending drawbar attaching member forwardly of said rear wheels, said pawl-and-ratchet means enabling adjustment of the elevation of the tree while being transported.

9. In a tree excavating and transporting apparatus, the combination of a tree ball supporting cradle having rear wheels disposed rearwardly of the center of gravity of the load while being transported, a forwardly extending drawbar attaching member mounted on said cradle for vertically pivotal movement, a front wheel, mounting means supporting said front wheel on said drawbar attaching member forwardly of the center of gravity of the load while being transported, said mounting means being rotatable about the axis of said drawbar attaching member to place said front wheel in ground engaging position for transporting a tree and enabling said front wheel to be swung clear of the ground while a tree is being excavated, retractible stop means for limiting downward pivotal movement of said drawbar attaching member with respect to said cradle, and adjustable supporting means connecting said cradle and drawbar attaching member at a point forwardly of said rear wheels.

10. In a tree excavating and transporting apparatus, a tree ball supporting cradle having a substantially upwardly and backwardly inclined surface for excavating and a substantially forwardly extending supporting surface for transporting, means to support the cradle on ground engaging wheels disposed so that the cradle may be rocked backwardly to permit the excavating surface of the cradle to be placed beneath a tree ball to be excavated, and to be rocked forwardly to support the tree ball for transporting, means to attach a forward wheel to said cradle for supporting the cradle on the ground in equilibrium when in transporting position, said means for attaching the forward wheel including means to permit the wheel to swing freely about a vertical axis for steering when in ground engaging position and means permitting said forward wheel to be rotated about a substantially horizontal axis when it is not required for supporting the cradle.

11. In a tree excavating and transporting apparatus, the combination of a tree ball supporting cradle having a rear excavating element and a forward supporting element, said cradle being mounted on ground engaging wheels so as to be rockable about a horizontal axis to permit the cradle to be moved either to an excavating or a transporting position, a forwardly disposed drawbar attaching member mounted on said cradle for vertically pivotal movement, a rearwardly disposed drawbar attaching member mounted on said cradle for vertically pivotal movement, a detachable drawbar operatively engageable with said drawbar attaching members, retractible stop means movable to a position limiting downward pivotal movement of said forwardly disposed drawbar attaching member, whereby said drawbar when engaged with said forwardly disposed drawbar attaching member may be operated to rock said cradle from an excavating to a transporting position, and retractible stop means movable to a position limiting downward pivotal movement of said rearwardly disposed drawbar attaching member, whereby said drawbar when engaged with said rearwardly disposed drawbar attaching member may be operated to maintain said cradle in equilibrium in a transporting position.

12. In a tree excavating and transporting apparatus, a tree ball supporting cradle having a rear excavating element and a forward transporting element trunnioned on ground engaging wheels so as to be rockable about a horizontal axis to permit the cradle to rest in equilibrium in either an excavating or a transporting position, a forwardly disposed drawbar socket mounted on the cradle for vertically pivotal movement, a detachable drawbar operatively engageable with the socket, stop means limiting pivotal movement of the drawbar when so engaged to permit the drawbar to be used to rock the cradle from an excavating to a transporting position, a rearwardly disposed socket mounted on said cradle for vertically pivotal movement and capable of detachable engagement with the drawbar, and stop means to limit vertical movement of the drawbar with respect to the cradle to permit the drawbar to be used to support the cradle in equilibrium in a transporting position when in engagement with the rearwardly disposed drawbar socket.

13. In a tree excavating and transporting apparatus, a tree ball supporting cradle having a rear excavating element and a forward supporting element trunnioned on ground engaging wheels so as to be rockable about a horizontal axis to permit the cradle to rest in equilibrium in either an excavating or a transporting position, a forwardly disposed drawbar socket mounted on said cradle for vertically pivotal movement, a detachable drawbar operatively engageable with the socket, rectractible stop means arranged to limit the downward pivotal movement of said forwardly disposed drawbar socket relative to the cradle enabling the drawbar to be used in engagement with the socket to rock the cradle from an excavating to a transporting position, a forward ground engaging wheel, means for detachably connecting said forward wheel to the cradle so as to support the cradle in equilibrium when in transporting position, and a rearwardly disposed drawbar socket on the cradle capable of detachable engagement with the drawbar for pushing or pulling the apparatus while in transporting position.

14. In a tree excavating and transporting apparatus, a tree ball supporting cradle having a rear excavating element and a forward transporting element trunnioned on ground engaging wheels so as to be rockable about a horizontal axis to permit the cradle to rest in equilibrium in either an excavating or a transporting position, a forwardly disposed drawbar attaching means mounted on the cradle for vertically pivotal movement, a detachable drawbar operatively engageable with the attaching means, retractible stop means for limiting movement of the engaged drawbar away from the cradle when the drawbar is used to rock the cradle from an excavating to a transporting position, a forward ground engaging wheel, means attaching said forward wheel to the cradle so as to support the cradle in equilibrium when in transporting position, and rearwardly disposed drawbar attaching means capable of detachable engagement with the drawbar for pushing or pulling the apparatus while in transporting position.

15. In a tree excavating and transporting apparatus, a tree ball supporting cradle having a rear excavating element and a forward transporting element trunnioned on ground engaging wheels so as to be rockable about a horizontal axis to permit the cradle to rest in equilibrium in either an excavating or a transporting position, a forwardly disposed drawbar attaching means mounted on the cradle for vertically pivotal movement, a detachable drawbar operatively engageable with the attaching means, retractible stop means for limiting movement of the engaged drawbar away from the cradle when the drawbar is used to rock the cradle from an excavating to a transporting position, a forward ground engaging wheel, means attaching said forward wheel to the cradle so as to support the cradle in equilibrium when in transporting position, rearwardly disposed drawbar attaching means mounted on said cradle for vertically pivotal movement and capable of detachable engagement with the drawbar for pushing or pulling the apparatus, and stop means for limiting movement of the drawbar away from the cradle when the drawbar is used in engagement with the rearwardly disposed attaching means to support the cradle in equilibrium while in transporting position.

16. In a tree excavating and transporting apparatus, a tree ball supporting cradle having a rear excavating element and a forward transporting element trunnioned on ground engaging wheels so as to be rockable about a horizontal axis to permit the cradle to rest in equilibrium in either an excavating or a transporting position, a forwardly disposed drawbar attaching socket means on the cradle, a detachable drawbar operatively engageable with the socket means to enable the drawbar to be used while engaged with said socket means to rock the cradle from an excavating to a transporting position, a forward ground engaging wheel on the cradle to support the cradle in equilibrium when in transporting position, rearwardly disposed drawbar attaching socket means mounted on said cradle for vertically pivotal movement and capable of detachable engagement with the drawbar for pushing or pulling the apparatus, and stop means for limiting movement of the drawbar away from the cradle when the drawbar is used in engagement with the rearwardly disposed socket means to support the cradle in equilibrium while in transporting position.

17. In a tree moving apparatus, the combination of a cradle having spaced side members connected by transversely extending tree ball supporting members, a pair of ground wheels, a shaft carrying said ground wheel and journalled in said side members, a vertical frame member depending from one of said transversely extending tree ball supporting members, a drawbar engaging member mounted on said vertical frame member for vertically pivotal movement, said drawbar engaging member extending generally longitudinally of said cradle, and a pivoted stop member mounted on said cradle and movable to a position beneath said drawbar engaging member to limit downward pivotal movement thereof relative to said cradle.

MILO G. COPLEN.

REFERENCES CITED

The following references are of record in the file of this patent:

FOREIGN PATENTS

| Number | Country | Date |
|---|---|---|
| 25,430 | Great Britain | Nov. 25, 1908 |
| 404,433 | Germany | Oct. 16, 1924 |
| 66,261 | Denmark | June 28, 1927 |